Jan. 19, 1926.
M. COPE
1,570,462
AUTOMATICALLY CLOSING DOOR
Filed April 20, 1925
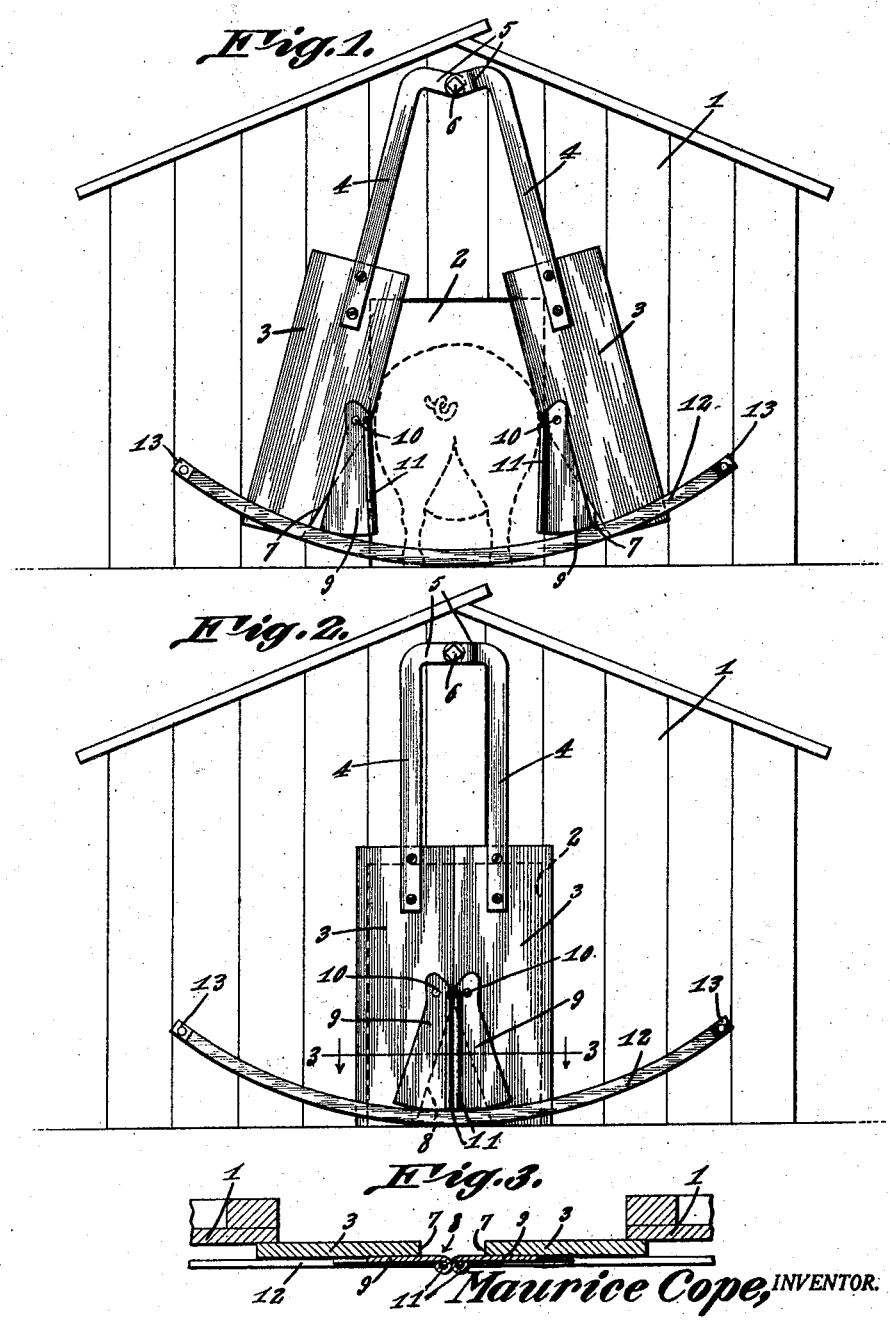
Maurice Cope, INVENTOR.
BY
Geo. P. Kimmel, ATTORNEY.

Patented Jan. 19, 1926.

1,570,462

UNITED STATES PATENT OFFICE.

MAURICE COPE, OF KINGSLEY, IOWA.

AUTOMATICALLY-CLOSING DOOR.

Application filed April 20, 1925. Serial No. 24,587.

*To all whom it may concern:*

Be it known that I, MAURICE COPE, a citizen of the United States, residing at Kingsley, in the county of Plymouth and State of Iowa, have invented certain new and useful Improvements in Automatically-Closing Doors, of which the following is a specification.

This invention relates to automatically closing doors or gates adapted particularly for use in connection with animal houses especially hog houses.

The primary object of this invention is the provision, in a manner as hereinafter set forth, of an automatically closing door for animal houses, so constructed that the animal can open the same with its nose or snout and force its way therethrough, the door closing behind the animal after the same has passed through.

Another object of the invention is the provision, in a manner as hereinafter set forth, of an automatically closing door having a smaller closure means connected therewith whereby a small animal may pass through the doorway without having to swing open the large door.

The invention contemplates the provision of a door formed of two panels, each panel having a suspending member which members are supported from a common point above the doorway in such a manner that the panels will naturally gravitate toward one another and normally remain with their abutting edges together across a door opening. The lower inner corner of each of the panels is cut away and to each of the panels above the cut away portion there is pivotally secured a smaller panel which smaller panels are also in contacting edge opposed relation when the doors are closed to cover the cut away lower corner of the larger panel. A small animal desiring to pass through the doorway which the larger panels guard, can, with its snout, move or spread open the two smaller panels which cover the cut away portion in the larger panel and pass through the doorway without disturbing the larger panels of the door. A larger animal will, with its mouth, force apart the two larger panels and as his body is forced therebetween will cause the same to swing laterally to allow for the passage of the animal. After the same has passed therethrough the panels will gravitate back until their inner edges are in contact for closing the doorway to the hut or through whatever the doorway is formed.

A final object of this invention is the provision, in a manner as hereinafter set forth, of an automatically closing door which will be of simple construction, strong and durable, inexpensive to manufacture, and easily placed into position.

The invention will be best understood from a consideration of the following detailed description taken in connection with the accompanying drawing forming a part of this specification, with the understanding that the invention is not confined to any strict conformity with the showing of the drawing, but may be changed and modified so long as such changes and modifications mark no material departure from the salient features of the invention, as expressed in the appended claims.

In the drawings:—

Figure 1 shows in elevation the device embodying this invention in the position which it will assume when an animal is passing therethrough.

Figure 2 shows the gate closed.

Figure 3 is a section taken upon the line 3—3 of Figure 2.

Referring now to the drawing in detail wherein like numerals of reference indicate corresponding parts throughout the several views, the numeral 1 indicates a house to which the door embodying this invention may be applied, the same being supplied with the doorway or entrance 2.

While the invention has been shown as applied to an animal house it is to be understood, however, that the same is not confined to such use, but may be applied to a fence or any other place where the device will be of service.

The door embodying this invention constitutes a pair of normally vertical rectangular panels 3, each of which has extending from the top thereof a hanger strap 4, the upper ends of which straps are inturned at right angles 5 and overlapped and pivotally secured above the center of the doorway 2 by a pivot bolt 6. The panels 3 due to the manner in which they are supported will normally hang vertically as shown in Figure 2 with the inner edges thereof abutting as shown.

The lower inner corner of each of the panels 3 is cut away at 7, thus forming when the panels are closed over the doorway 2 the inverted V-shaped opening 8.

Pivotally secured to the outer face of the panels 3 adjacent the inner side edge thereof and just above the cut away portions, is a swinging flap member 9 pivoted at the point 10, and these flap members 9 have inner normally abutting edges rolled as at 11. Due to the manner in which the flaps 9 are hung they will normally hang in such a position that the inner edges are in abutment as shown in Figure 2, thus closing the passage 8 through the lower portion of the panels 3.

Adapted to be secured across the face of the house 1 and also to overlie the lower portion of the panels 3, is an arcuate guide member 12, the ends 13 of which are inset and secured to the house as is shown, thus raising the portion intermediate the ends in such a manner that the panels can slide between the inner face thereof and the outer face of the house. Thus, an animal coming out of the house will not force the panels outwardly as they would do if the guide members 12 were not employed.

From the foregoing it will be seen that when an animal, such as a pig, wishes to enter the house 2, he will, if he is a small pig, force apart the flaps 9 at the lower portion of the panels 3 swinging them to one side and thus making room for the passage of his body through the opening 8 in the lower portion of the panels. When the animal has passed through the flap will fall back to place and thus close the door. If the animal is a large one, he can start the movement of the panels 3 by opening the small flaps 9 with his snout and after the snout has been extended through the opening 8 further pressure thereof against the edges 7 of the panels will cause the panels 3 to swing laterally and thus allow the animal to pass through the opening 2 as indicated in Figure 1.

From the foregoing description it will be readily seen that there has been provided a unique and effective animal house closure which will be strong and durable, effective in keeping the house closed, and easily built and applied.

Having thus described my invention what I claim is:

1. In a device of the character set forth, a closure comprising a pair of panels, means for pivotally supporting said panels in a manner to cause them to gravitate towards each other to close an entrance, and means whereby an animal may cause said panels to swing apart for passage through said entrance, said last mentioned means further constituting a means whereby a small animal may pass through said entrance without moving said panels.

2. In a device of the character set forth, a closure comprising a pair of panels, means for pivotally supporting said panels in a manner to cause them to gravitate towards each other to close an entrance, said panels each having its lower inner corner cut away to provide a small entrance when said panels are in contact, and shiftable elements carried by said panels and normally closing said small entrance and further operatable by a small animal to uncover said small entrance for passage through the closure.

3. In a device of the character set forth, a closure comprising a pair of panels in edge abutting contact to close an entrance, a supporting strap for each panel, a strap having its upper ends inturned, a pivot member common to and extending through said inturned ends, and a guide means overlying the lower end of said panel to maintain the same in position.

4. In a device of the character set forth, a closure comprising a pair of panels in edge abutting contact to close an entrance, each panel having its lower inner corner cut away to set, when the panels are abutting, a small passage through the closure, a supporting strap for each panel, each strap having its upper end inturned, a pivot member common to and extending through said inturned end, and a flap pivoted to each panel above and covering said cut away portions, said flap normally depending in edge to edge contact to cover said small passage.

5. In a device of the character set forth, a closure comprising a pair of panels in edge abutting contact to close an entrance, each panel having its lower inner corner cut away to set, when the panels are abutting, a small passage through the closure, a supporting strap for each panel, each strap having its upper end inturned, a pivot member common to and extending through said inturned end, a flap pivoted to each panel above and covering said cut away portions, said flap normally depending in edge to edge contact to cover said small passage, and means overlying the lower ends of said panels for guiding the same.

6. A device of the character described, comprising a closure member, having one lower corner thereof cutaway, a suspension element swingingly supporting the same before an entrance, a hanging flap pivoted to said closure above said cutaway portion and normally closing the same, and an arcuate guide member overlying the lower part of said closure to guide the same when swinging to open or closed position.

In testimony whereof, I affix my signature hereto.

MAURICE COPE.